United States Patent [19]

Okubo

[11] Patent Number: 5,306,135
[45] Date of Patent: Apr. 26, 1994

[54] NOZZLE TOUCH MECHANISM FOR INJECTION PRESS COMPOSITE MOLDING MACHINE

[75] Inventor: Hideaki Okubo, Hiratsuka, Japan

[73] Assignee: Kabushiki Kaisha Komatsu Seisakusho, Tokyo, Japan

[21] Appl. No.: 834,527

[22] PCT Filed: Jul. 30, 1990

[86] PCT No.: PCT/JP90/00968
§ 371 Date: Feb. 6, 1992
§ 102(e) Date: Feb. 6, 1992

[87] PCT Pub. No.: WO91/01868
PCT Pub. Date: Feb. 21, 1991

[30] Foreign Application Priority Data

Aug. 11, 1989 [JP] Japan .................. 1-208952

[51] Int. Cl.⁵ .................. B29C 45/07; B29C 45/20
[52] U.S. Cl. .................. 425/569; 425/574
[58] Field of Search .......... 425/138, 150, 567, 569, 425/568, 571, 168, 182, 186, 190, 574

[56] References Cited

U.S. PATENT DOCUMENTS

| | | | |
|---|---|---|---|
| 3,577,597 | 5/1971 | Draudt et al. | 425/186 |
| 4,332,544 | 6/1982 | Aoki | 425/567 |
| 4,386,903 | 6/1983 | Wybenga | 425/574 |
| 4,462,782 | 7/1984 | Koser | 425/186 |
| 4,589,839 | 5/1986 | Kurumaji et al. | 425/569 |
| 4,676,730 | 6/1987 | Yamasaki | 425/569 |
| 4,902,220 | 2/1990 | Nakagawa | 425/574 |
| 4,983,117 | 1/1991 | von Buren et al. | 425/567 |
| 5,035,599 | 7/1991 | Harashima et al. | 425/150 |
| 5,040,969 | 8/1991 | von Buren et al. | 425/574 |
| 5,108,689 | 4/1992 | Uehara et al. | 425/150 |

FOREIGN PATENT DOCUMENTS

| | | | |
|---|---|---|---|
| 33-2885 | 4/1958 | Japan . | |
| 59-7834 | 1/1984 | Japan . | |
| 61-22917 | 1/1986 | Japan . | |
| 61-217224 | 9/1986 | Japan | 425/574 |
| 62-25519 | 2/1987 | Japan . | |
| 62-83119 | 4/1987 | Japan . | |
| 2-92514 | 4/1990 | Japan . | |

Primary Examiner—Jay H. Woo
Assistant Examiner—Joseph Leyson
Attorney, Agent, or Firm—Richards, Medlock & Andrews

[57] ABSTRACT

An improvement in an injection press composite molding machine, provides a nozzle touch mechanism in which even when the horizontal injection unit expands or contracts due to heat, the positional relation between the injection nozzle and the mold remains unchanged, and in which initial alignment of injection nozzle with the mold is easy, and further in which the thermal expansion or contraction thereof is small. An adjusting mechanism (40) for adjusting the position of an injection nozzle (10b) is provided on an upper portion of the stand (9) which presses the injection nozzle (10b) onto a lower mold (3). A positioning stopper (21) is provided for one end of a base (14) to which a table (4) of a horizontal injection unit (10) is journaled. The adjusting mechanism has a plurality of bolts for adjusting the vertical and horizontal positions of the injection nozzle. A heat insulating member may be interposed between the tips of these bolts and the injection nozzle.

20 Claims, 2 Drawing Sheets

NOZZLE TOUCH MECHANISM FOR INJECTION PRESS COMPOSITE MOLDING MACHINE

FIELD OF THE INVENTION

The present invention relates to a nozzle touch mechanism for an injection press composite molding machine, and more particularly, to an improvement in a mechanism of the touch between a mold and an injection nozzle.

BACKGROUND ART

A conventional injection press composite molding machine employs either a combination of a horizontal press unit and a vertical injection unit or a combination of a vertical press unit and a horizontal injection unit The former combination has problems in that the height of the machine generally ends up to be rather great and the operability of changing is not favorable. Therefore, the latter combination is more widely used. For example, a molding machine (Japanese Patent Laid-Open No. 61-22917) as shown in FIG. 3 is disclosed. An injection nozzle 32 is placed to abut on a side surface 31a of a fixed mold 31, and a resin passage (a hot runner) 33 is cut through the inside of the mold from a portion to be in contact with the nozzle, and further, a heater 34 is provided around the resin passage. In such a structure, a resin 35 is injected to a cavity (D).

However, the above-described conventional injection press composite molding machine has problems caused by expansion and contraction of the injection unit due to heat. The expanding injection unit pushes and shifts the mold 31, and the contracting injection unit reduces the contact surface pressure between the injection nozzle 32 and the mold 31, resulting in a leakage of the resin. To solve such problems, the present inventor proposes in Japanese Patent Application No. 63-245663 an improvement in which a unit for mounting an injection unit thereon is slidable so that even when the injection unit expands or contracts due to heat, the relation between the injection nozzle and a mold is unchanged. However, this improvement still has problems in that the initial alignment of the nozzle with the mold is difficult and the thermal expansion and contraction of the injection unit is large. To solve the above-mentioned conventional problems, the present invention is directed to provide a nozzle touch mechanism for an injection press composite molding machine, in which even when the injection unit expands or contracts due to heat, the positional relation between the injection nozzle and the mold remains unchanged, and in which initial alignment of the injection nozzle with the mold is easy, and further in which the thermal expansion or contraction thereof is small.

SUMMARY OF THE INVENTION

In a press composite molding machine including: a vertical press unit for opening and closing molds; a horizontal injection unit placed below a die plate of a vertical press unit and having an injection nozzle through which a melted resin is supplied between the molds; a table on which the horizontal injection unit is mounted; an actuator which supports one end of the table and pushes the injection nozzle through a stand and onto one of the molds; and a base which rotatably supports the other end of the table by means of a journal and which is horizontally slidable; a nozzle touch mechanism comprises: an adjusting mechanism which is provided on an upper portion of the stand and with which adjustment is made so that a contact surface of the injection nozzle aligns with a contact portion of one of the molds; and a positioning stopper which faces one end of the base and defines the position thereof.

The adjusting mechanism on the upper portion of the stand comprises a bracket and a plurality of bolts for adjusting the vertical and horizontal positions of the injection nozzle. A lower portion of the stand is fixed to one end of the table by a knock pin. A heat insulating member may be interposed between the plurality of bolts and the injection nozzle which contacts the tips of the bolts. The positioning stopper comprises a bracket and a bolt which faces one end of the base and which defines the horizontal position of the base.

In such a construction, even when the horizontal injection unit whose injection portion is placed under the die plate and the fixed mold expands or contracts due to heat, the relative positions of the mold and the injection nozzle of the injection portion remain unchanged since the injection unit is slidable. Therefore, the expansion of the injection unit does not shift the mold, and the contraction thereof does not result in a leakage of the resin. Also, the adjusting mechanism and the positioning stopper make it easy to align the contact surface of the injection nozzle with the contact portion of the mold, e.g. after a mold is mounted on the die plate or after the injection nozzle is checked for maintenance. Further, since the adjusting mechanism employs bolts, which require less contact surface area, or further since it uses an interposed heat-insulating member, heat conduction is reduced, so that the pushing up of the injection nozzle due to the thermal expansion of the injection unit is eliminated.

BEST MODE FOR CARRYING OUT THE INVENTION

Figure 1:
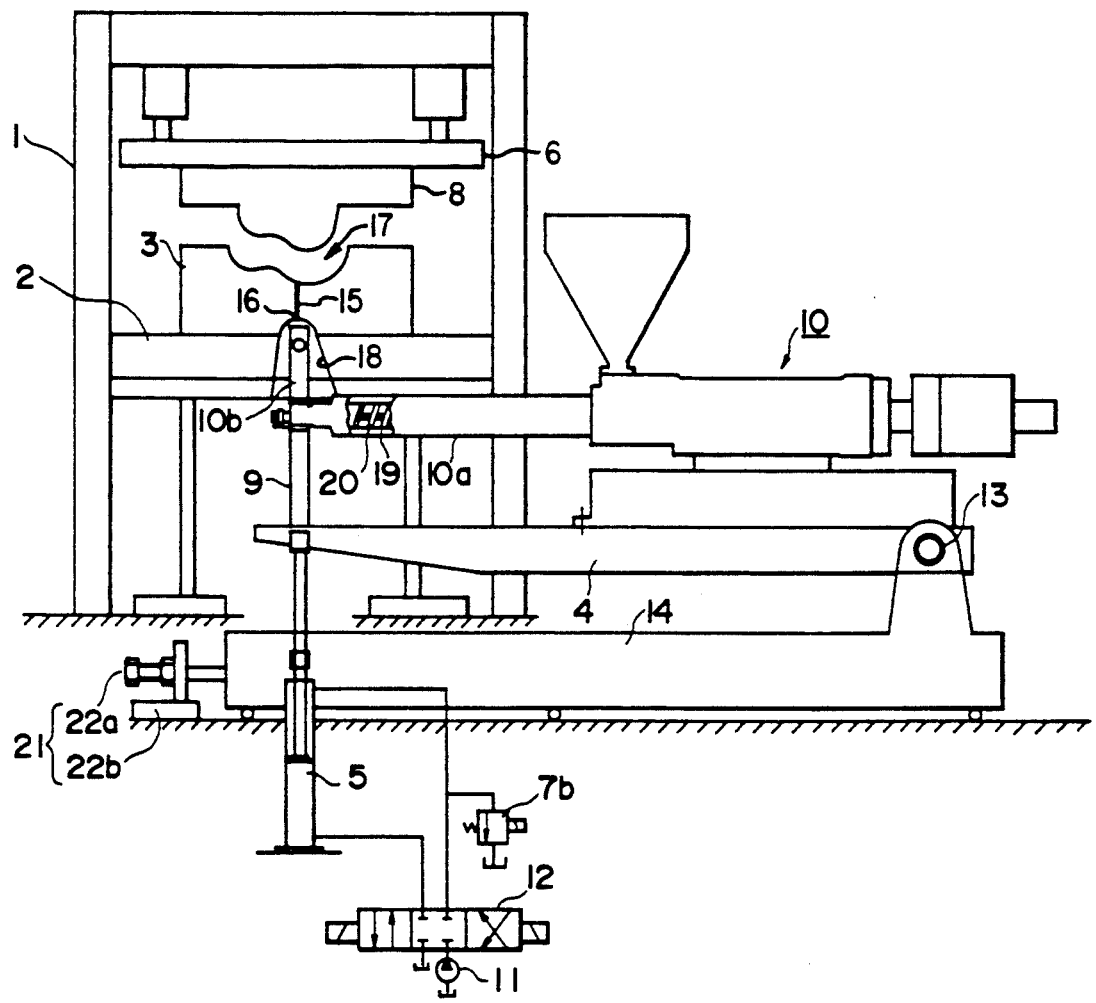
FIG. 1 is a front view of an injection press composite molding machine according to an embodiment of the present invention.
Figure 2:
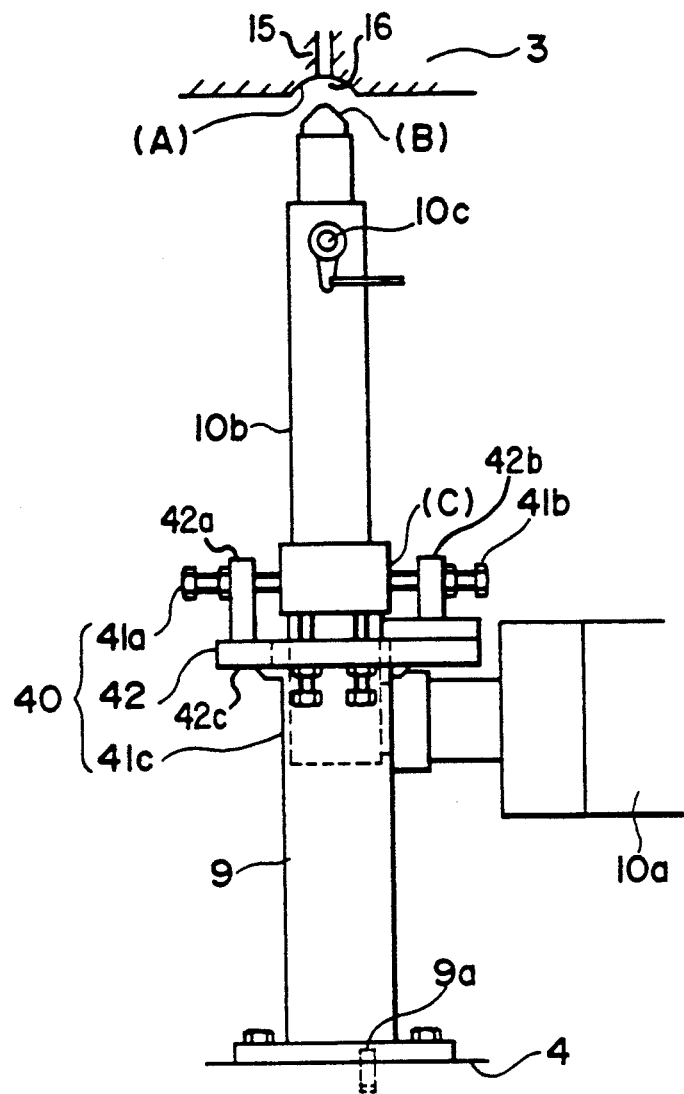
FIG. 2 is an enlarged partial view of the injection press molding machine according to an embodiment of the present invention.
Figure 3:
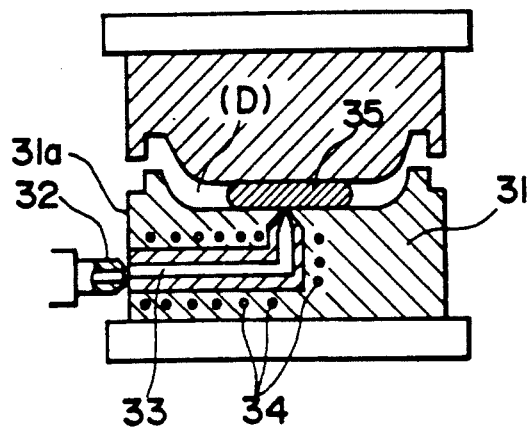
FIG. 3 is a sectional view of a mold portion according to a conventional press molding apparatus.

An embodiment of the injection press composite molding machine according to the present invention will be described in detail with reference to the drawings. FIG. 1 is an entire view of an embodiment of the present invention. FIG. 2 is an enlarged partial view of a nozzle touch mechanism of the machine shown in FIG. 1 With reference to FIG. 1, a press molding machine 1 comprises a fixed die plate 2 on which a lower mold 3 is mounted and a movable die plate 6 on which an upper mold 8 is mounted, wherein the lower mold 3 has a resin injection passageway 15 therein extending from a resin injection opening 16 in the bottom surface of the lower mold 3 to the cavity 17 which is formed by the closing of the upper mold 8 against the lower mold 3, and wherein the fixed die plate 2 has an opening 18 therethrough corresponding to the position of the resin injection opening 16 in the lower mold 3. A horizontal injection unit 10 has an injection portion 10a composed of an injection cylinder 19, a screw 20 and other parts.

The injection portion 10a of horizontal injection unit 10, comprising the injection cylinder 19, is placed below the fixed die plate 2 and the lower mold 3. As shown in FIGS. 1 and 2, an "L"-shaped injection nozzle 10b (referred to as a "injection nozzle 10b" hereinafter) of the injection portion 10a is pressed onto a bottom surface of the lower mold 3 by an actuator 5 via a pivotable table 4 and a stand 9 so that a contact surface (B) of the injection nozzle 10b abuts a nozzle contact portion (A) of the mold 3 with a predetermined pressure. The injection nozzle 10b is provided with a valve 10c which opens and closes a resin passage. The valve 10c is operated by a servomotor (not-shown) so as to open during injection of resin and to close during pressing of the resin. As shown in FIG. 2, the injection nozzle 10b is supported by an adjusting mechanism 40 mounted on an upper portion of the stand 9. A lower portion of the stand 9 is fixed by a knock pin 9a to one end of the table 4 of the horizontal injection unit 10. The adjusting mechanism 40 is composed of a plurality of bolts 41a, 41b and 41c supported by a bracket 42, which in turn is mounted on an upper portion of the stand 9. The tip portions of these bolts abut the injection nozzle 10b. A horizontal slide thereof is carried out by adjusting the bolts 41a and 41b with respect to vertically extending portions 42a and 42b of bracket 42, and a vertical shift by adjusting the bolts 41c with respect to a horizontally extending portion 42c of bracket 42. The other end of the table 4 is rotatably journaled by a pin 13 fixed to a base 14. The actuator 5 is operated by switching the pressure from a pressure source 11 with a switch valve 12, so as to press by way of the stand 9 the injection nozzle 10b onto the bottom surface of the lower mold 3 with a predetermined pressure and to pivot the table 4 about the supporting point, i.e. the pin 13. The horizontal injection unit 10 is slidably mounted on the table 4. Facing one end of the base 14 is a positioning stopper 21 which defines the position thereof The positioning stopper 21 is composed of stationary bracket 22b and a bolt 22a which extends through the stationary bracket 22b into contact with one end of base 14 so that the positioning stopper 21 defines the horizontal position of the base 14. The base 14 can be horizontally slid by adjusting the position of the bolt 22a in the bracket 22b. The position of the base 14 can thus be fixed, with the contact surface (B) of the injection nozzle 10b facing the contact portion (A) of the lower mold 3 Alternatively, the base 14 may be slid by an actuator or the like.

Operation of the machine thus constructed will be described. After molds have been changed for molding a different product, or after the injection nozzle 10b, the screw 20, etc. of the horizontal injection unit 10 have been checked or replaced, the injection nozzle 10b must be positioned so that the center line of the injection nozzle 10b coincides with the center line of a resin-injecting opening 16 the lower mold 3 (referred to as the "center line of the lower mold 3"), in order to secure the sealing between the injection nozzle 10b and the bottom surface of the lower mold 3. For such an operation, pressured oil is sent from the pressure source 11 to the actuator 5, which pivots the table 4 about the pin 13 to move the injection nozzle 10b via the stand 9, until the injection nozzle 10b reaches a location close to the bottom surface of the lower mold 3. Then, the bolts 41a, 41b, 41c of the adjusting mechanism 40 mounted on the stand 9 are adjusted to slide or shift the horizontal injection unit 10 until the center lines of the injection nozzle 10b and the lower mold 3 substantially coincide. Next, while pressured oil is further sent from the pressure source 11 to the actuator 5 so that the center lines of the injection nozzle 10b and the lower mold 3 substantially coincide, the base 14 is horizontally slid with the bolt 22a of the positioning stopper 21. By such procedure, the center lines of the injection nozzle 10b and the lower mold 3 coincide, and the position of the injection nozzle 10b with respect to the base 14 is fixed.

Alternatively to the above procedure, the base 14 may precedingly be slid with the bolt 22a of the positioning stopper 21 to adjust the injection nozzle 10b so that the center line of the injection nozzle 10b substantially coincides with the center line of the lower mold 3, before the bolts 41a, 41b, 41c of the adjusting mechanism 40 mounted on the stand 9 are adjusted to slide or rotate the horizontal injection unit 10 so as to achieve the coincidence of the center lines of the injection nozzle 10b and the lower mold 3.

Since the injection unit 10 slides on the table 4, the center lines of the injection nozzle 10b and the lower mold 3 remain coincided during operation of the injection press composite molding machine even when the temperature of the injection portion 10a rises 200° to 400° C. and the injection portion 10a expands. If the horizontal injection unit 10 has been moved for purging or the like before another injection press molding process, the base 14 can be set and fixed at the previous position with a high level of repeatability by using the bolt 22a of the positioning stopper 21. Further, after the screw 20 is replaced or after the injection portion 10a is disassembled for maintenance, the previous position of the injection nozzle 10b can be easily regained during the reassembly since the stand 9 is positioned and fixed firmly to the table 4 by, for example, the knock pin 9a. Also, the heat conduction from the high-temperature injection nozzle 10b to the stand 9 is hindered by the reduced area of the contact surface (C), where only tip portions of the bolts 41a, 41b, 41c of the adjusting mechanism 40 mounted on the stand 9 contact the injection nozzle 10b to support it. Therefore, the stand 9 expands only a little, so as to push up the injection nozzle 10b only a little. If a heat insulating member is provided at the contact surface (C), heat conducting to the stand 9 becomes even less.

As described above, according to the present invention, the position of the injection nozzle 10b relative to the lower mold 3 remains unchanged even when the injection unit 10 expands or contracts due to heat. Therefore, the injection nozzle 10b does not push or move the mold, and resin does not leak if the injection nozzle 10b contracts. After molds are set or after the nozzle 10b is checked, the contact surface (B) of the injection nozzle 10b can be easily adjusted to coincide with the contact portion (A) of the mold 3 by using the adjusting mechanism 40 and the positioning stopper 21. The reduced contact surface (C) between the adjusting mechanism 40 and the stand 9 reduces the heat conduction and, thus, reduces the force pushing up the injection nozzle 10b. Also, the injection nozzle 10b is easily returned to the previous position during the reassembly after disassembling the injection unit, e.g. for purging or changing screws.

INDUSTRIAL APPLICABILITY

The present invention is useful as a nozzle touch mechanism in which even when the injection unit of the injection press composite molding machine expands or contracts due to heat, the positional relation between the injection nozzle and the mold remains unchanged, so that a shift of the mold or leakage of a resin will not occur, and is further useful as a nozzle touch mechanism in which the injection nozzle and the mold can be easily positioned.

I claim:

1. In an injection press composite molding machine including: a vertical press unit having a movable die plate adapted to support an upper mold, having a fixed die plate adapted to support a lower mold wherein the lower mold has a resin injection passageway therein extending from a resin injection opening in a bottom surface of the lower mold to a mold cavity formed by the lower mold and the upper mold, and being adapted to move the upper mold toward the lower mold to form a mold cavity therebetween and to move the upper mold away from the lower mold, the fixed die plate having an opening therethrough corresponding to the position of the resin injection opening of the lower mold; a horizontal injection unit positioned below said fixed die plate and having an injection nozzle through which a melted resin can be supplied to the resin injection opening in the lower mold and then to the mold cavity formed by said upper and lower molds; said lower mold having a contact portion surrounding the resin injection opening in said lower mold for receiving said injection nozzle; said injection nozzle having a contact surface for mating with said contact portion; a table on which said horizontal injection unit is mounted; said table having a first end and a second end; a base; said first end of said table being rotatably supported on said base; a stand positioned on said second end of said table; and an actuator which supports said second end of said table and which can push said injection nozzle via said stand against said lower mold; said base being horizontally slidable;

the improvement comprising a nozzle touch mechanism which comprises:

adjusting means provided on an upper portion of said stand and positioned between said stand and said injection nozzle for adjusting the vertical position of said injection nozzle and the horizontal position of said injection nozzle so that said contact surface of said injection nozzle aligns with said contact portion of said lower mold; and a positioning stopper which adjustably defines the position of said base.

2. An injection press composite molding machine according to claim 1, wherein said adjusting means comprises a bracket mounted on the upper portion of said stand and a plurality of bolts adjustably supported by said bracket so that of said adjusting means only tip portions of said bolts contact said injection nozzle to support said injection nozzle, whereby the adjustment of said bolts with respect to said bracket adjusts the vertical and horizontal positions of said injection nozzle, and wherein a lower portion of said stand is fixed to said second end of said table by a knock pin.

3. An injection press composite molding machine according to claim 2, wherein a heat insulating member is interposed between said plurality of bolts and said injection nozzle.

4. An injection press composite molding machine according to claim 1, wherein said positioning stopper comprises a stationary bracket and a bolt adjustably associated with said bracket, said bolt facing one end of said base and adjustably defining the horizontal position of said base.

5. An injection press composite molding machine according to claim 1, wherein a lower portion of said stand is fixed to said second end of said table by a knock pin.

6. An injection press composite molding machine according to claim 1, wherein a heat insulating member is interposed between said adjusting means and said injection nozzle.

7. An injection press composite molding machine according to claim 1, wherein said adjusting means comprises at least one first bracket mounted on an upper portion of said stand and a plurality of bolts adjustably supported by said first bracket so that only tip portions of said bolts contact said injection nozzle to support said injection nozzle, whereby the adjustment of said bolts with respect to said bracket adjusts the vertical and horizontal positions of said injection nozzle.

8. An injection press composite molding machine according to claim 7, wherein said positioning stopper comprises a second bracket which is stationary and at least one bolt adjustably associated with said second bracket, said at least one bolt adjustably associated with said second bracket facing one end of said base and adjustably defining the horizontal position of said base.

9. An injection press composite molding machine according to claim 8, wherein a lower portion of said stand is fixed to said second end of said table by a knock pin.

10. An injection press composite molding machine according to claim 9, wherein a heat insulating member is interposed between said injection nozzle and the tip portions of said plurality of bolts of said adjusting means.

11. In an injection press composite molding machine including:

a vertical press unit for opening and closing an upper mold and a lower mold wherein said upper mold and said lower mold form a mold cavity therebetween, said vertical press unit having a fixed die plate for supporting said lower mold and having a movable die plate for supporting said upper mold, a lower surface of said lower mold having a nozzle contact portion containing a resin-injection opening through which molten resin can be injected into said cavity, said resin-injection opening having a centerline, said fixed die plate having an opening therethrough corresponding to the position of the resin-injection opening of said lower mold;

a horizontal injection unit positioned below said fixed die plate and having an "L" shaped injection nozzle with an outlet portion of said "L" shaped injection nozzle having a contact surface for mating with said contact portion of said lower mold such that molten resin can be supplied through said injection nozzle and said resin-injection opening into said cavity, said outlet portion of said "L" shaped injection nozzle having a centerline;

a base, said base being horizontally slidable;

a table on which said horizontal injection unit is slidably mounted, said table having a first end and a second end, said first end of said table being pivotably mounted on said base;

a stand positioned on said second end of said table; and an actuator which supports said second end of said table and which can push said injection nozzle via said stand against said lower mold;

the improvement comprising a nozzle touch mechanism, said nozzle touch mechanism comprising:

adjusting means provided on an upper portion of said stand and positioned between said stand and said injection nozzle for adjusting the horizontal position of said injection nozzle and the vertical position of said injection nozzle so that the center line of the output portion of said injection nozzle aligns with the center line of said resin-injection opening.

12. An injection press composite molding machine according to claim 11 wherein said nozzle touch mechanism further comprises a positioning stopper which adjustably defines the position of said base.

13. An injection press composite molding machine according to claim 11, wherein said adjusting means comprises a bracket mounted on an upper portion of said stand and a first plurality of bolts adjustably supported by said bracket, with the tips of said first plurality of bolts extending generally horizontally from said bracket towards said injection nozzle, whereby the adjustment of said first plurality of bolts with respect to said bracket adjusts the horizontal position of said injection nozzle.

14. An injection press composite molding machine according to claim 13, wherein a heat insulating member is interposed between said injection nozzle and the tips of said first plurality of bolts.

15. An injection press composite molding machine according to claim 13, wherein said adjusting means further comprises a second plurality of bolts adjustably supported by said bracket, with the tips of said second plurality of bolts extending generally vertically from said bracket towards said injection nozzle so that of said adjusting means only tips of the first and second pluralities of bolts contact said injection nozzle to support said injection nozzle, whereby the adjustment of said second plurality of bolts with respect to said bracket adjusts the vertical position of said injection nozzle.

16. An injection press composite molding machine according to claim 15, wherein a heat insulating member is interposed between said injection nozzle and the tips of said first plurality of bolts and the tips of said second plurality of bolts.

17. An injection press composite molding machine according to claim 11, wherein said adjusting means comprises a bracket means mounted on an upper portion of said stand and positioned between said stand and said injection nozzle and having at least one generally vertically extending portion and a first plurality of bolts adjustably supported by said at least one generally vertically extending portion of said bracket means, with the tips of said first plurality of bolts extending in the range of generally horizontally to absolutely horizontally from said at least one generally vertically extending portion of said bracket means towards said injection nozzle for adjusting the horizontal position of said injection nozzle.

18. An injection press composite molding machine according to claim 17, wherein said bracket means further comprises at least one generally horizontally extending portion and at least one generally vertical bolt adjustably positioned in said at least one generally horizontally extending portion, with the tip of said at least one generally vertical bolt extending in the range of generally vertically to absolutely vertically from said at least one generally horizontally extending portion of said bracket means towards said injection nozzle for adjusting the vertical position of said injection nozzle, whereby of said adjusting means only the tips of the first plurality of bolts and the at least one generally vertical bolt contact said injection nozzle to support said injection nozzle, so that the adjustment of said first plurality of bolts with respect to said at least one generally vertically extending portion of said bracket means adjusts the horizontal position of said injection nozzle and the adjustment of said at least one generally vertical bolt with respect to said at least one generally horizontally extending portion of said bracket means adjusts the vertical position of said injection nozzle.

19. An injection press composite molding machine according to claim 18, wherein a heat insulating member is interposed between said injection nozzle and the tips of said at least one generally vertical bolt and said plurality of bolts.

20. An injection press composite molding machine according to claim 19, further comprising a positioning stopper which adjustably defines the position of said base, wherein said positioning stopper comprises a bracket which is stationary and at least one stopper bolt adjustably associated with the stationary bracket, said at least one stopper bolt adjustably associated with said stationary bracket facing one end of said base and adjustably defining the horizontal position of said base.

* * * * *